May 16, 1933.  C. P. GALANOT  1,909,342
DUMPING VEHICLE
Filed Dec. 30, 1929    2 Sheets-Sheet 1
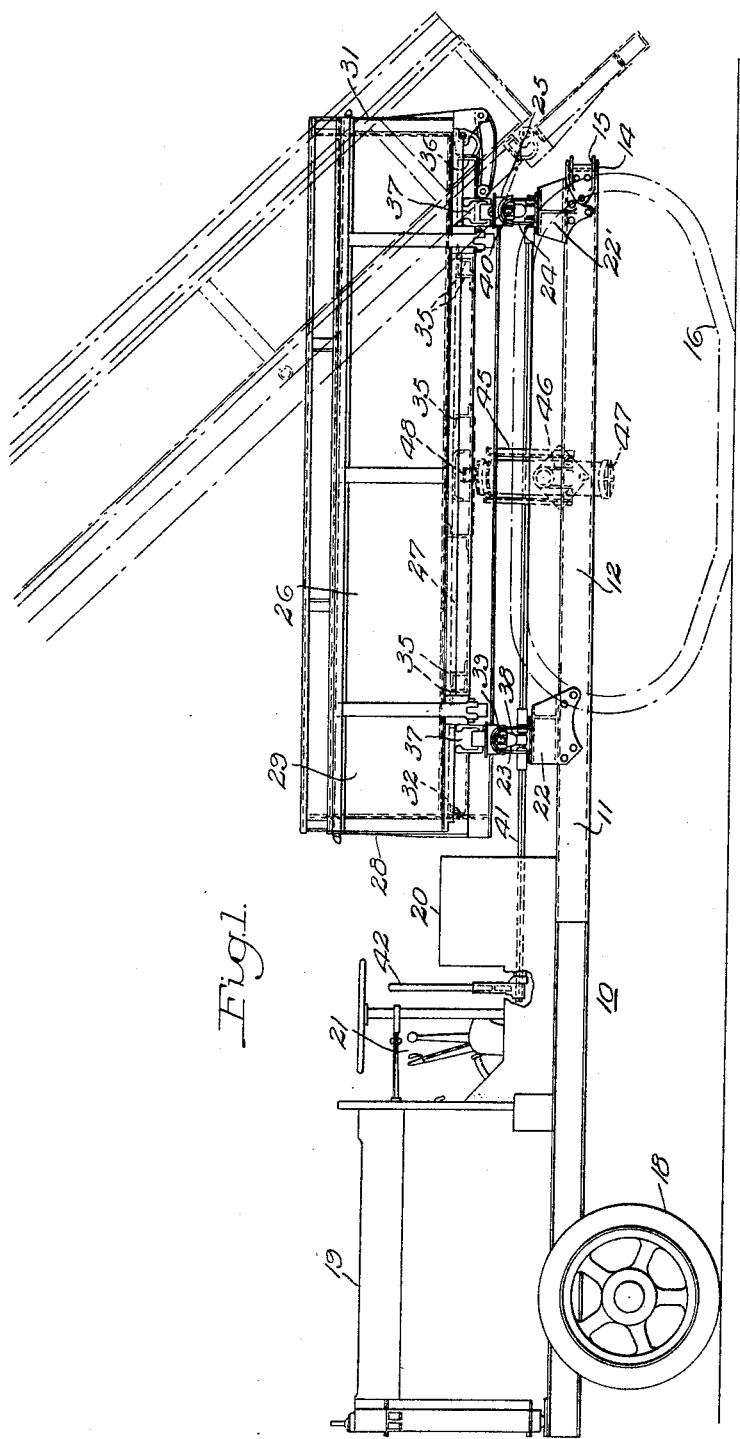
INVENTOR
Camille P. Galanot
by his attorneys
Byrnes, Stebbins, Parmelee & Blenko May 16, 1933.  C. P. GALANOT  1,909,342
DUMPING VEHICLE
Filed Dec. 30, 1929  2 Sheets-Sheet 2
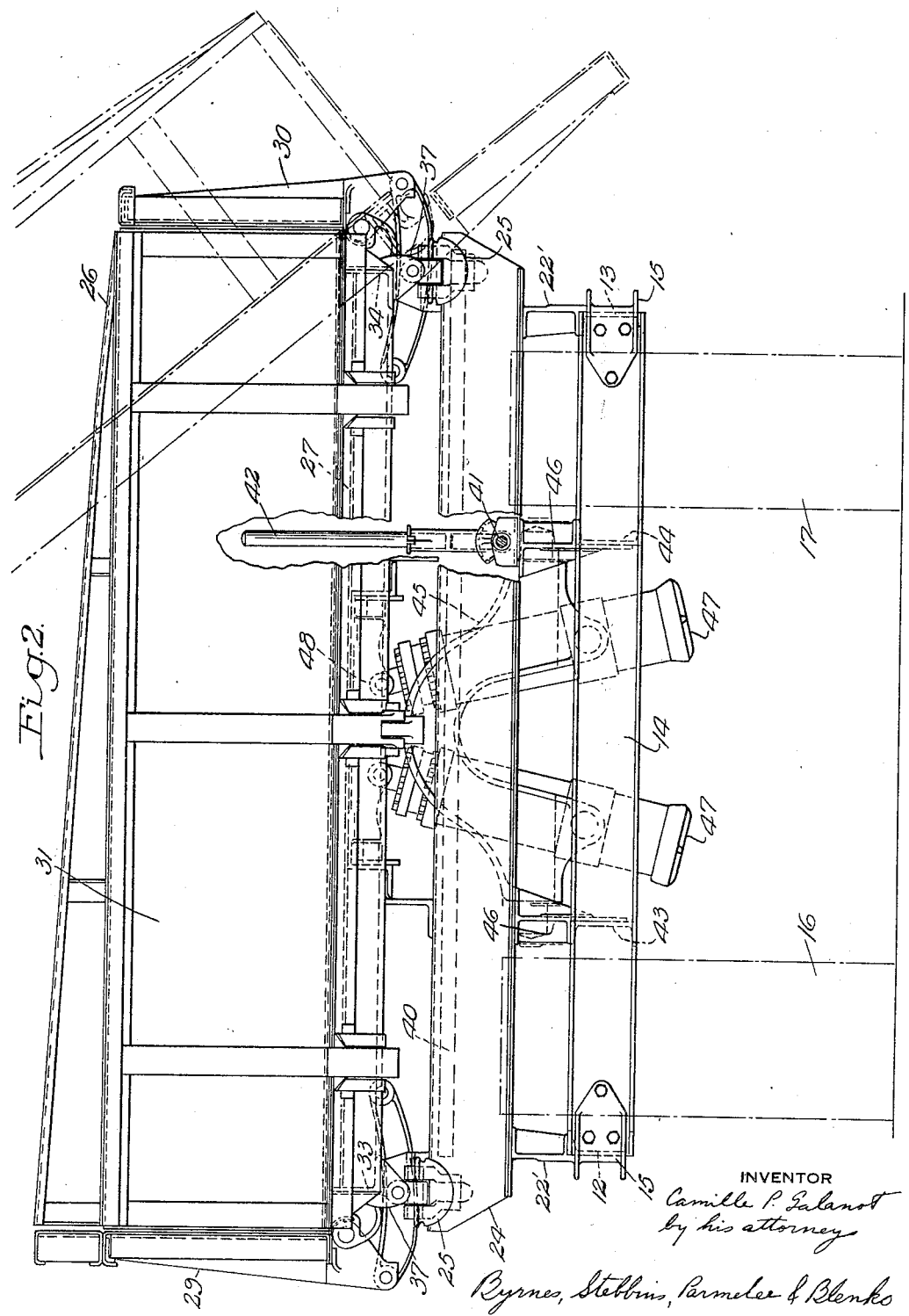

Patented May 16, 1933

1,909,342

UNITED STATES PATENT OFFICE

CAMILLE P. GALANOT, OF YOUNGSTOWN, OHIO, ASSIGNOR TO THE COMMERCIAL SHEARING & STAMPING CO., OF YOUNGSTOWN, OHIO, A CORPORATION OF OHIO

DUMPING VEHICLE

Application filed December 30, 1929. Serial No. 417,316.

My invention relates to vehicles provided with dumping bodies and, in particular, to a vehicle of the so-called endless tread tractor type having such body thereon. Wheeled motor vehicles such as trucks have previously been provided with bodies adapted for dumping to either side and to the rear thereof. In the construction of motor trucks, however, it has been found necessary, on account of the great weight of the loads to which motor trucks are subjected to design the wheels thereof with a considerable radius, in order to provide a substantial area of contact with the ground. The large diameter of wheel necessitates that the body be placed at a considerable height from the ground. It is also necessary to provide space between the truck chassis and the dumping body for the mechanism involved in the three-way dumping construction.

Because of the considerable height of motor trucks with dumping bodies, it has been found necessary to space the wheels thereof at a comparatively great distance from center to center in order to afford the necessary stability of the vehicle which is constantly in use on rough ground. The wide spacing of the wheels makes the truck an unwieldly vehicle to control and, further, interferes with the proper dumping of the truck contents to the side since the wheels and frame of the truck, on account of their great width, obstruct the angular movement of the dumping body. It has been customary, for example, to arrange the side dumping axes of a truck body in substantial alignment with the supporting wheels of the truck, and such arrangement is obviously undesirable for the reasons above pointed out.

I overcome the foregoing objections to wheeled vehicles having dumping bodies by providing a vehicle of the endless tread tractor type with such a body. As is well known, this vehicle consists of a chassis completely or partially supported on a pair of traveling belts consisting of metallic links or shoes. The arrangement of the belts is such as to provide a large area of contact with the ground. Since the belt is generally formed in a substantially oval shape, it is not necessary that the chassis be elevated above the ground very far. This makes it possible to place a dumping body on such vehicle at a comparatively low elevation so that the whole structure is inherently stable. Because of this inherent stability it is possible to have the dumping body overhang the supporting belts and be hinged for dumping about axes which are considerably beyond the external edges of the belts. This construction eliminates all interference between the dumping body and the chassis or under-carriage, and at the same time, permits the contents of the truck body to be dumped at a considerable distance therefrom which is always an advantage when dumping at the edge of a fill.

I have illustrated a present preferred embodiment of the invention in the accompanying drawings which are intended by way of example only, and are not to limit the scope of the invention since the latter may be otherwise embodied within the scope of my broader claim.

In the drawings:

Figure 1 is a side elevation of a tractor with a dumping body thereon.

Figure 2 is a rear view to an enlarged scale of the tractor illustrated in Figure 1.

Referring specifically to the drawings, I employ a tractor 10 having a chassis 11. The chassis 11 comprises side members 12 and 13 and a rear member 14. The side and rear members are connected by angle brackets 15. The chassis is supported principally upon a pair of endless belts 16 and 17 which are indicated diagrammatically since their construction and the means by which they carry the weight of the vehicle are well known. A pair of front wheels 18 are provided for steering the vehicle. The usual motor for driving the tractor is located on the chassis at 19 and the usual driver's seat 20 which may be enclosed in a cab (not shown) is located adjacent the controlling and steering mechanism 21 of the vehicle.

Supporting blocks 22 and 22' are secured to the members 12 and 13 which lie outside of the endless belts 16 and 17. Front and rear cross members 23 and 24 are supported on the blocks 22 and 22' and, at their ends, carry hinge pin cups 25.

The dumping body is indicated generally at 26 and consists of a bottom 27 and front wall 28, down-folding side gates 29 and 30 and a down-folding tail gate 31. The body bottom is built of structural members including a front end channel 32, side Z bars 33 and 34, intermediate Z bars 35 and a rear Z bar 36. The side Z bars carry bearing brackets 37 to which hinge pins 38 are pivotally secured for engagement with the hinge pin cups 25.

I provide means for selectively locking two of the hinge pins 38 in their cups to permit dumping about an axis passing through the pins so locked. This means comprises a pair of locking bars 39 and 40 which are adapted for transverse movement within the cross members 23 and 24. Upon transverse movement of the bars 39 and 40 from their central neutral position their ends enter openings in the hinge pins 38 to secure the latter to their cups. The hinge pins on the side of the vehicle opposite that toward which the bars were moved are free and can be lifted from their cups as the body is tilted for side dumping.

For controlling the movement of the locking bars 39 and 40 I provide a rod 41 running longitudinally of the vehicle and having an operating lever 42 and means engaging the bars 39 and 40 to shift them transversely as the lever is moved.

The rear locking bar 40 is of such length that it engages both pins 38 cooperating with the rear cross member 24 when in its neutral position. The body may thus be dumped toward the rear when the lever 42 and the rod 41 are in neutral position, in which case both the hinge pins cooperating with the cross member 23 will be free to leave their cups.

In addition to the side and end members 12, 13 and 14 the tractor chassis includes longitudinal members 43 and 44. A trunnion block 45 is journaled in bearings 46 supported on said longitudinal members. The trunnion block carries a pair of hydraulic cylinders 47 having pistons therein connected to a trunnion bearing 48 secured to the bottom of the dumping body. Suitable fluid pressure supply means (not shown) are provided for operating the cylinders 47 to apply upward pressure to the dumping body.

A further description of the details of the dumping mechanism and the means for automatically opening the gates as the body is dumped are omitted since these features are not material to the present invention and are fully described and claimed in my copending application for Hoist mechanism, Serial No. 257,707 filed February 28, 1928.

It will be apparent from the foregoing description that a dumping body mounted on an endless tread tractor has many advantages not found in the known arrangement of a dumping body on a four-wheeled motor truck. As may be observed in Figure 2, the side dumping axes of the body lie well beyond the extreme outer edge of the endless belts so that no interference with the vehicle chassis is encountered by the body as the latter is tilted. It is also obvious from the drawings that the dumping body is positioned close to the ground so as to provide a low center of gravity and a high stability factor. Because of these facts, it is possible to place the endless belts close together without causing the structure to be top heavy or otherwise unstable. This is an advantage in dumping as previously pointed out since it is possible to dump the contents of the body well away from the endless belts. Thus when dumping at the end of a fill, it is not necessary that a vehicle approach dangerously close to the edge thereof.

Another important fact is that the weight of the body is transmitted directly to the endless belts through the side members 12 and 13. The construction shown is not possible with wheeled vehicles in which the longitudinal chassis members must lie within the wheels and, since the body tilting axes must lie at least as far from the center of the vehicle as the center line of the wheel, it is obvious that the body proper must be supported on cantilever beams of some length. By placing the longitudinal chassis members outside of the endless belts, the body tilting hinges are supported almost directly below and the chassis members transfer the load directly to the endless belts.

Although I have described but a single preferred embodiment of the invention I do not intend to be limited to the specific details thereof since the invention may be practiced in other forms. For this reason, all changes in arrangement and construction which fall within the scope of the appended claim may be made without departing from the spirit of the invention.

I claim:

A vehicle comprising a chassis frame, supporting endless treads disposed within the frame, and extending thereabove, cross members extending transversely of said frame ahead of and behind said treads, and a dumping body tiltably mounted on said members.

In testimony whereof I have hereunto set my hand.

CAMILLE P. GALANOT.